US010765256B2

(12) United States Patent
Alves (10) Patent No.: US 10,765,256 B2
(45) Date of Patent: Sep. 8, 2020

(54) FOOD PROCESSING SYSTEM PRESENTING A GUIDING FLOW ARRANGEMENT AND PROCESS FOR USE THEREOF

(71) Applicant: FLAMA, FABRICA DE LOUCAS E ELECTRODOMESTICOS, SA, Cesar (PT)

(72) Inventor: Luis Alves, Cesar (PT)

(73) Assignee: FLAMA, FABRICA DE LOUCAS E ELECTRODOMESTICOS, SA, Cesar (PT)

( * ) Notice: Subject to any disclaimer, the term of this patent is extended or adjusted under 35 U.S.C. 154(b) by 126 days.

(21) Appl. No.: 15/873,011

(22) Filed: Jan. 17, 2018

(65) Prior Publication Data
US 2018/0140131 A1 May 24, 2018

Related U.S. Application Data

(63) Continuation of application No. PCT/PT2016/000008, filed on Jul. 12, 2016.

(30) Foreign Application Priority Data

Jul. 20, 2015 (PT) .......................................... 108708

(51) Int. Cl.
*A47J 36/06* (2006.01)
*B01F 15/02* (2006.01)
(Continued)

(52) U.S. Cl.
CPC .............. *A47J 36/06* (2013.01); *A47J 43/046* (2013.01); *A47J 43/07* (2013.01); *A47J 43/0716* (2013.01); *B01F 15/0234* (2013.01)

(58) Field of Classification Search
CPC ......... A47J 36/06; A47J 43/046; A47J 43/07; A47J 43/0716; B01F 15/0234
See application file for complete search history.

(56) References Cited

U.S. PATENT DOCUMENTS 2,733,052 A * 1/1956 Luther ................ A47J 43/0727
366/205
4,087,053 A * 5/1978 Voglesonger ......... A47J 43/046
241/282.1

(Continued)

FOREIGN PATENT DOCUMENTS

CN 1684616 A 10/2005
CN 201759412 U 3/2011
(Continued)

OTHER PUBLICATIONS

Official Communication issued in International Patent Application No. PCT/PT2016/000008, dated Feb. 1, 2018.
(Continued)

*Primary Examiner* — Tony G Soohoo
(74) *Attorney, Agent, or Firm* — Keating & Bennett, LLP (57) ABSTRACT

A food processing system presents a recipient configured for receiving food ingredients and a lid presenting upwards and downwards sides configured to engage with the perimeter of the recipient thereby at least partially closing the recipient, and a driving arrangement confined within a casing and adapted to drive a tool support arranged inside of the recipient, whereby the lid presents a single lid opening advantageously presenting a generally circular form and disposed, e.g., centrally relative to the lid, whereby the upwards side of the lid presents a first surface extending on a generally outer region of the lid and further presents a second surface extending around the opening and developing at a lower level in respect of the first surface, and whereby the lid further presents a flow guiding unit arranged next to the lid opening and adapted to provide a streamlined flow of a fluid poured into the second surface into the recipient when the lid is placed thereupon.

14 Claims, 8 Drawing Sheets

(51) Int. Cl.
*A47J 43/07* (2006.01)
*A47J 43/046* (2006.01)

(56) References Cited

U.S. PATENT DOCUMENTS

| | | | |
|---|---|---|---|
| 4,137,834 A | 2/1979 | Uibel | |
| D345,488 S * | 3/1994 | Barnard | D7/387 |
| 5,809,872 A * | 9/1998 | Sundquist | A47J 43/046 241/37.5 |
| 6,189,441 B1 * | 2/2001 | Beaudet | A47J 43/046 99/492 |
| 6,513,966 B1 * | 2/2003 | Gort-Barten | A47J 43/0766 241/37.5 |
| 6,554,466 B1 * | 4/2003 | Lee | A47J 43/046 241/37.5 |
| 6,776,086 B1 * | 8/2004 | Chang Chien | A47J 43/0766 241/37.5 |
| 7,648,264 B2 * | 1/2010 | Breviere | A47J 43/0716 366/205 |
| 7,753,223 B2 * | 7/2010 | Boozer | A47J 43/0727 220/254.7 |
| 8,157,435 B2 * | 4/2012 | Pryor, Jr. | A47J 43/0727 241/282.1 |
| 9,439,538 B2 * | 9/2016 | Paget | A47J 43/0716 |
| 9,555,384 B2 * | 1/2017 | Haney | B01F 7/00291 |
| 9,895,028 B2 * | 2/2018 | Gerard | A47J 36/06 |
| 10,441,113 B2 * | 10/2019 | Leppert | A47J 43/0716 |
| 2005/0018532 A1 * | 1/2005 | Nikkah | A47J 43/042 366/129 |
| 2008/0031087 A1 * | 2/2008 | Pryor | A47J 43/0716 366/194 |
| 2010/0232256 A1 * | 9/2010 | Pryor, Jr. | A47J 36/06 366/347 |
| 2012/0213900 A1 * | 8/2012 | Zakowski | A47J 27/04 426/509 |
| 2015/0313414 A1 * | 11/2015 | Gerard | A47J 36/06 99/353 |
| 2018/0140131 A1 * | 5/2018 | Alves | A47J 43/0716 |
| 2019/0216265 A1 * | 7/2019 | Neubert | A47J 19/02 |
| 2019/0239681 A1 * | 8/2019 | Thies | A47J 36/06 |

FOREIGN PATENT DOCUMENTS

| | | |
|---|---|---|
| CN | 203333279 U | 12/2013 |
| DE | 10 2010 017 387 A1 | 12/2011 |
| DE | 10 2011 052 781 A1 | 2/2013 |
| DE | 10 2014 100 967 A1 | 2/2015 |
| EP | 1 566 124 B1 | 6/2006 |
| EP | 1 651 086 B1 | 6/2008 |
| FR | 2 999 403 A1 | 6/2014 |
| WO | 2005/020772 A1 | 3/2005 |
| WO | 2005/089601 A1 | 9/2005 |

OTHER PUBLICATIONS

Official Communication issued in Chinese Patent Application No. 201680054437.0, dated May 27, 2020.

* cited by examiner

FOOD PROCESSING SYSTEM PRESENTING A GUIDING FLOW ARRANGEMENT AND PROCESS FOR USE THEREOF

CROSS-REFERENCES TO RELATED APPLICATIONS

This application is a continuation of copending International Application No. PCT/PT2016/000008, filed Jul. 12, 2016, which is incorporated herein by reference in its entirety, and additionally claims priority from Portuguese Application No. 108708, filed Jul. 20, 2015, which is incorporated herein by reference in its entirety.

The present invention refers to the field of food processing systems presenting a recipient and lid arrangement.

BACKGROUND OF THE INVENTION

Conventional technology includes several solutions relating to cooking systems presenting a recipient adapted for receiving food ingredients and a respective lid adapted for providing closure of said recipient and means adapted for fluid flows through said lid into and out of said recipient.

Document U.S. Pat. No. 4,137,834 discloses a cooking device for heating and mixing foods of the type of the present invention. The cooking device presents a recipient and a respective lid, whereby said lid presents a central opening.

Documents EP 1651086 B1 discloses a cooking vessel comprising a bowl arranged in a casing and a lid, whereby an annular top portion of the casing presents flow guiding means adapted for supporting pouring of food out of said recipient.

Document EP 1566124 B1 discloses a closure lid for closing a receptacle of an electrical household appliance and suitable for containing liquid, whereby said lid is provided with an orifice and a closure device that comprises a movable portion that is adapted so that it can be moved between a plurality of positions including an open position allowing the liquid to be poured out by tilting the receptacle, and whereby the movable portion can be placed in a disassembly position in which the movable portion can be separated from the body of the lid.

Document U.S. Pat. No. 8,157,435 B2 discloses a lid for a mixing device whereby a pour spout extends generally vertically upwardly from the base and further includes a channel that generally surrounds the pour spout to collect errant drips of foodstuff when the lid is mounted to the jar. This solution proposes two lid openings, a bigger one that can be regarded as a main opening dedicated to pouring the contents of the recipient outwards, and a small secondary opening dedicated to collecting and returning any spillovers remaining from said while also assisting said pouring through the main opening. Said non-closable secondary opening is disadvantageous in certain culinary preparations where a substantial gas closure of the recipient may be used. Moreover, this solution does not provide for a configuration of said secondary opening providing a streamlined flow of the fluid poured into said lid, but a rather bulk pattern at a high flow rate. This is a relevant aspect in some culinary preparations, such as in the case of adding olive oil or a seasoning sauce to certain preparations, whereby it is important to provide said fluid at a relatively slow supply rate, sometimes during relatively long periods while cooking is ongoing.

The documents DE 10 2010 017387 A1 and DE 201 2014 100 967 A1 disclose closing elements adapted for closing a lid opening in a food processor of the same type as the one of the present invention. However, none of these documents discloses a solution for retaining said closing element in said lid opening while further providing for a fluid connection through said lid opening, including inwards and outwards of said recipient. This is advantageous in terms of optionally preventing an unintentional handling of the recipient with the lid and thereby resulting in a release of the closing element and eventual hazardous spills of hot cooking preparation outwards.

SUMMARY

According to an embodiment, a food processing system for processing food ingredients may have a recipient for receiving food ingredients and a lid presenting an upwards side and a downwards side configured to engage with the perimeter edge of said recipient, and a driving arrangement confined within a casing and adapted to drive a tool support arranged so that it can support a food processing tool inside of said recipient, whereby said lid presents a lid opening advantageously presenting a generally circular form and disposed for example in a centered manner relative to said lid, whereby the upwards side of said lid presents a first surface extending on a generally outer region of said lid and further presents a second surface extending around at least part of said single lid opening and developing at a lower level in respect of said first surface, characterized in that said lid presents flow-guiding means arranged next to said single lid opening, including a wall part and at least one flow part, and adapted so that an amount of fluid poured upon said second surface can be contained inwards along most of the perimeter of said lid opening and can flow under the action of the gravity force through said lid opening into said recipient when said lid is arranged on said recipient.

Another embodiment may have a process for using a food processing system presenting a recipient configured for receiving food ingredients and a lid presenting an upwards side and a downwards side configured to engage with the perimeter of said recipient thereby at least partially closing said recipient, and a driving arrangement confined within a casing and adapted to drive a tool support arranged inside of said recipient, wherein said lid presents a single lid opening advantageously presenting a generally circular form and disposed for example in a centered manner relative to said lid, wherein the upwards side of said lid presents a first surface extending on a generally outer region of said lid and further presents a second surface extending around at least part of said opening and developing at a lower level in respect of said first surface, in particular a food processing system according to claim 1, which process may have the steps of: —providing food ingredients to said recipient and placing said lid upon said recipient, advantageously in a removable fixed engagement with the perimeter edge of said recipient, —optionally actuating said driving arrangement, —pouring a fluid upon said second surface, wherein said fluid is conducted under the action of the force gravity into said recipient via a flow guiding unit provided next to said lid opening of said lid.

In particular, a food processing system according to the present invention comprises a recipient that presents a spout-like arrangement and a lid that presents a single lid opening and flow guiding means arranged next to said lid opening and adapted so that an amount of fluid poured upon said second surface can be contained inwards around most of the perimeter of said lid opening and can flow under the action of the gravity force through said single lid opening into inside of said recipient when said lid is arranged on said recipient.

Moreover, according to an advantageous embodiment, said flow guiding means comprise a wall part extending upwards from and along part of the perimeter edge of said lid opening, and at least one flow part that is provided as a flow passage section in said wall part and configured so that said fluid can flow streamlined through said lid opening.

According to a particularly advantageous embodiment, said flow part is configured as a spout-like arrangement including a constrain of flow passage section and a downwards oriented flow surface in relation to said second surface. This configuration advantageously provides for a streamlined flow of said fluid circulating under the force of gravity after being poured upon said second surface of said lid.

A related objective of the present invention is to provide a closing element adapted to substantially close said lid opening and further providing the options of enabling vapor exit out of the recipient, and of retention thereof to said lid, thereby avoiding unintentional releases and any hazardous spills of hot cooking preparations.

The aforementioned objective is solved according to the present invention.

A related objective of the present invention is to provide a process for using a food processing system presenting a lid with flow guiding means.

The aforementioned objective is solved according to the present invention by means of a process according to claim 12, whereby dependent claims present advantageous embodiments thereof.

In particular, said process comprises the steps of providing food ingredients to said recipient and placing said lid upon said recipient, advantageously in a removable fixed engagement with the perimeter edge of said recipient, optionally actuating said driving arrangement, and pouring a fluid upon said second surface, whereby said fluid is conducted under the action of the force gravity into said recipient via flow guiding means provided next to said lid opening of said lid.

BRIEF DESCRIPTION OF THE DRAWINGS

Embodiments of the present invention will be detailed subsequently referring to the appended drawings, in which the Figures show, in schematic representations.

DETAILED DESCRIPTION OF THE INVENTION

Figure 1:
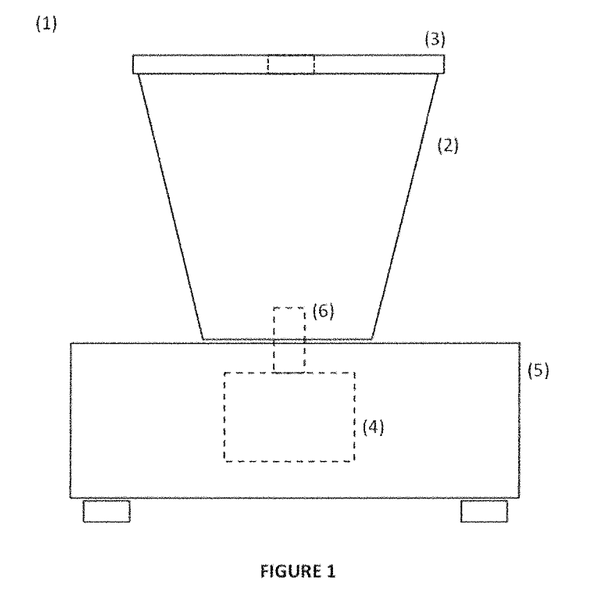
FIG. 1: a side view of a first embodiment of a food processing system (1) according to the present invention.

FIG. 1 shows a food processing system (1) according to the present invention. As schematically depicted, said food processing system (1) presents a recipient (2) for receiving food ingredients, and a lid (3) presenting an upwards side and a downwards side configured to engage with the perimeter edge of said recipient (2), and a driving arrangement (4) confined within a casing (5) and adapted to drive a tool support (6) arranged so that it can support a food processing tool inside of said recipient (2). Said lid (3) presents a single lid opening (31) advantageously presenting a generally circular form and disposed for example in a centered manner relative to said lid (3). According to an advantageous embodiment, said food-processing system (1) further comprises a heating device (not represented) arranged next to said recipient (2) and adapted to provide a regulated heat transfer to said recipient (2). As further represented in FIG. 8, in an advantageous embodiment thereof, said food processing system (1) further comprises a closing element (8) adapted to close said single lid opening (31) thus optionally rendering said recipient (2) substantially closed to any substantial gas exhaustion.

Figure 2:
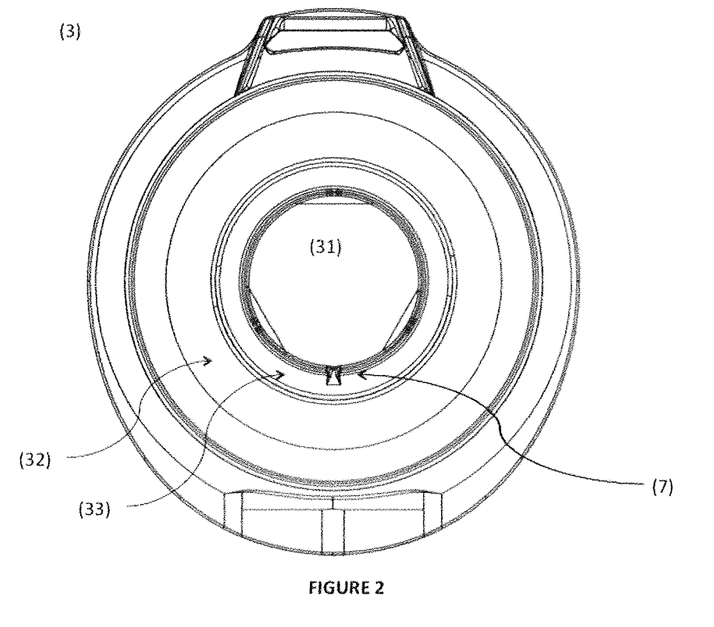
FIG. 2: a top view of a first embodiment of a lid (3) according to the present invention.
Figure 3:
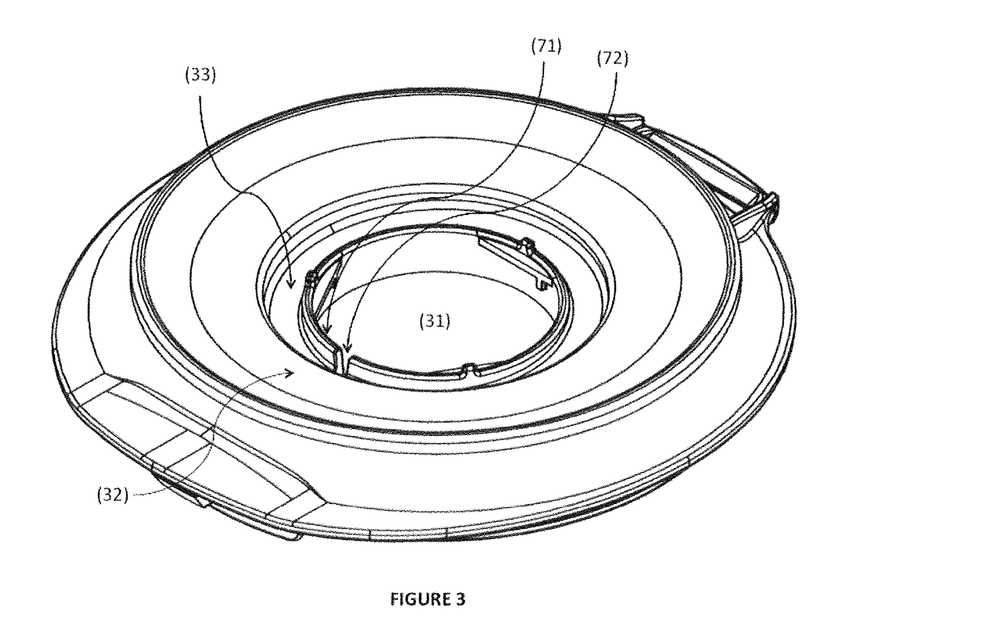
FIG. 3: a perspective view from above of a first embodiment of a lid (3) according to the present invention.

As best seen in the top view of said lid (3) represented in FIG. 2 and in the perspective top view represented in FIG. 3, the upwards side of said lid (3) presents a first surface (32) extending on a generally outer region of said lid (3) and further presents a second surface (33) extending around at least part of said opening (31) and developing at a lower level in respect of said first surface (32).

According to a first inventive aspect, said lid (3) presents flow guiding means (7) arranged next to said lid opening (31) and adapted so that an amount of fluid poured upon said second surface (33) can be contained inwards around most of the perimeter of said lid opening (31) and can flow under the action of the gravity force through said lid opening (31) into inside of said recipient (2) when said lid (3) is arranged on said recipient (2). A first central aspect of the present invention thus relates to providing means constraining a fluid flow poured in the vicinity of said lid opening (31) so as to flow into said recipient (2) through said lid opening (31). This advantageously provides for the possibility of a user adding a particular fluid, such as olive oil or another type of seasoning sauce, and leaving it to flow in a streamlined manner into said recipient.

According to a first advantageous embodiment, said flow guiding means (7) comprise a wall part (71) extending upwards from the edge of said lid opening (31) and extending along part of the perimeter of said lid opening (31), and at least one flow part (72) that is provided as a flow passage section in said second surface (33) or in said wall part (71) and configured so that said fluid can flow streamlined into said lid opening (31). In fact, according to another advantageous embodiment, as depicted in FIG. 2, said flow part (72) presents a substantial narrowing of flow passage section in relation to said second surface (33), thereby generating a streamlined fluid flow over the edge and through said lid opening (31).

Figure 4:
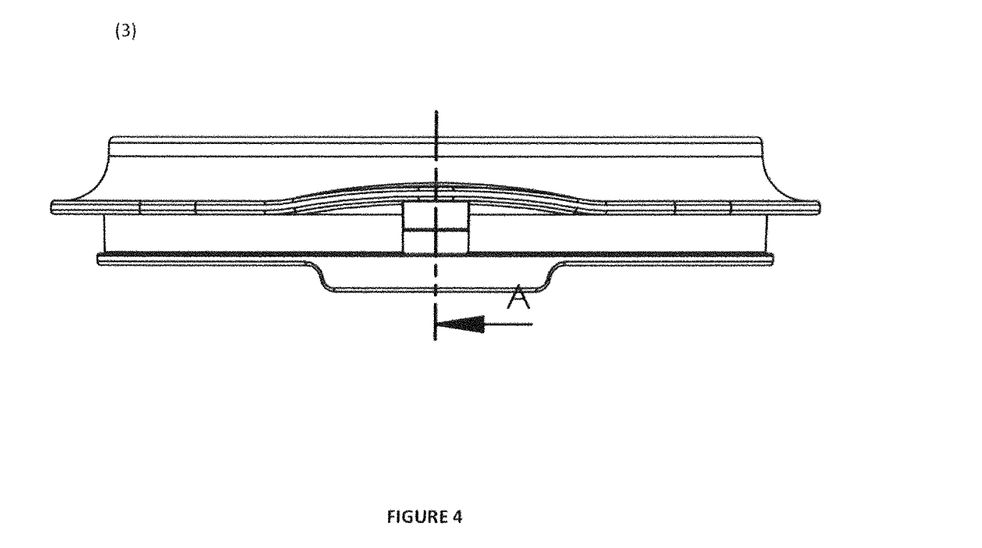
FIG. 4: a side view of the lid (3) according to FIG. 3.
Figure 5:
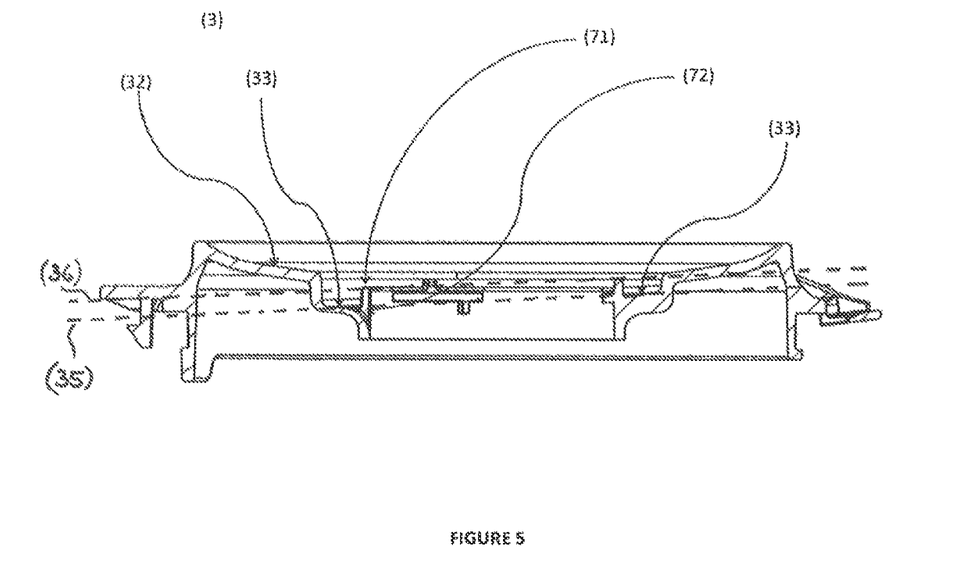
FIG. 5: a cut view of the lid (3) according to the AA place indicated in FIG. 4.

FIGS. 4 and 5 represent further construction details of the first embodiment of lid (3) according to FIGS. 2 and 3.

As best seen in the section cut view of FIG. 5, said lid (3) presents a second surface (33) that extends next to a wall part (71) along the perimeter edge of said lid opening (31), whereby there is provided an inclination along said extension towards said flow part (72).

This advantageously facilitates the fluid to flow towards said flow part (72) under the action of the force of gravity.

As further illustrated in FIG. 5, and according to another advantageous embodiment, said wall part (71) presents a similar height (36) along a respective perimeter extension in relation to said second surface (33). Moreover, it is further advantageous when said height (36) of said wall part (71) is similar to the level difference (35) between said second surface (33) and said first surface (32) along a respective perimeter.

Figure 6:
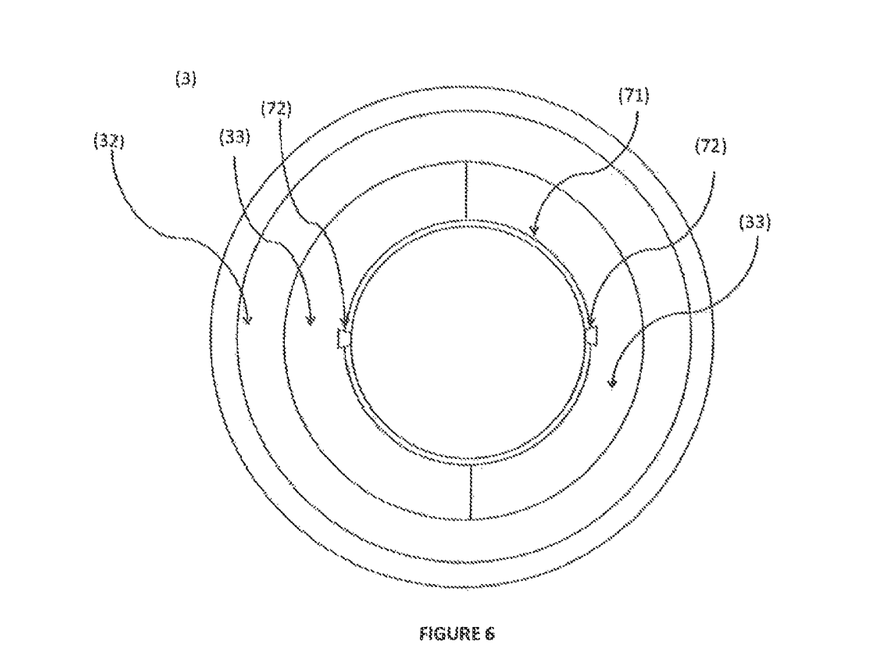
FIG. 6: a top view of a second embodiment of a lid (3) according to the present invention.

FIG. 6 depicts a second embodiment of lid (3) presenting flow-guiding means (7) as part of a food processing system (1) according to the present invention. In this case, there are provided two second surfaces (33) provided at respectively different inclination relative to a horizontal plane and arranged towards a respective flow part (72). This embodiment advantageously provides for the possibility of pouring two seasoning fluids simultaneously and leaving them to flow in a streamlined manner in said recipient (2).

Figure 7:
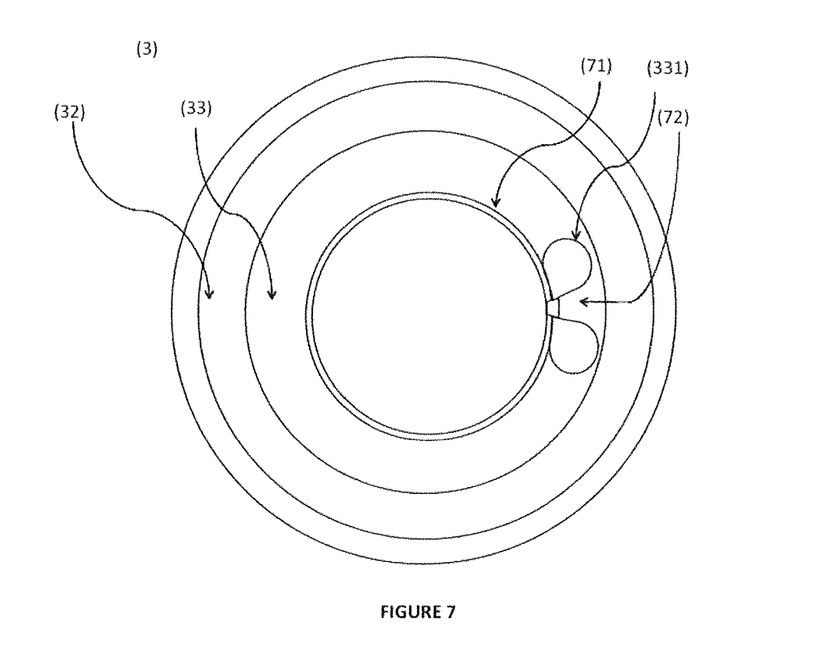
FIG. 7: a top view of a third embodiment of a lid (3) according to the present invention.

FIG. 7 illustrates a third embodiment, whereby there are two cavity elements (331) provided in said second surface (33) and in fluid communication with a respective flow part (72).

According to an advantageous embodiment, said cavity elements (331) are sized to correspond to a given amount of fluid volume, thus facilitating the measurement by a user of a fluid quantity to be poured.

According to another advantageous embodiment, said cavity element (331), such as a cavity of channel-like, or a plurality of cavity elements in fluid communication with each other and with a respective flow part (71).

Figure 8:
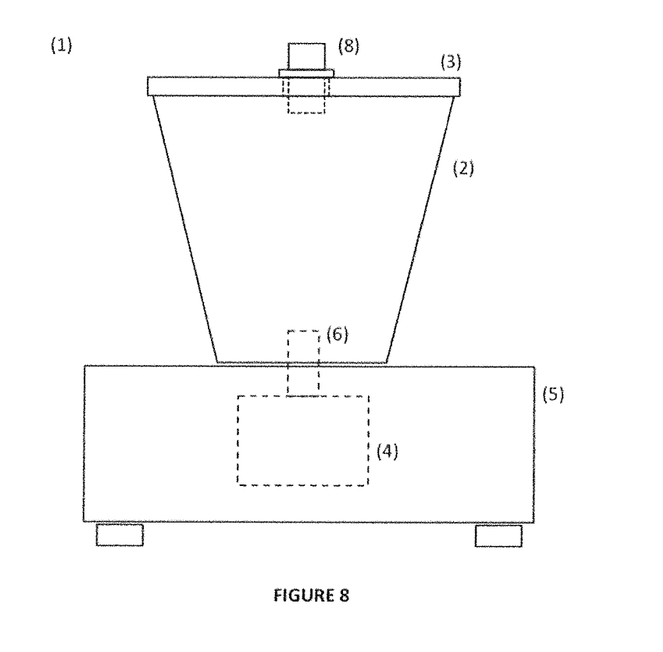
FIG. 8: a side view of a second embodiment of a food processing system (1) according to the present invention.
Figure 9:
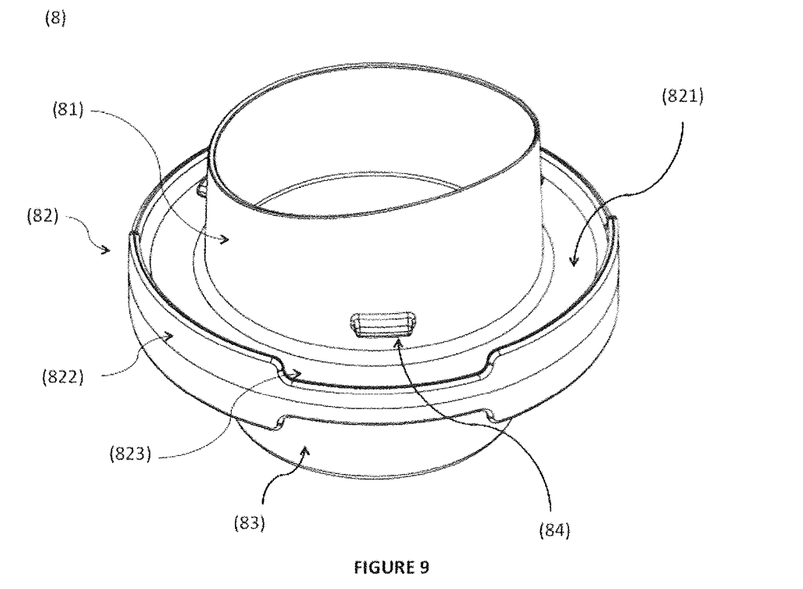
FIG. 9: a perspective view from above of an advantageous embodiment of a closing element (8) in a food processing system according to the present invention.
Figure 10:
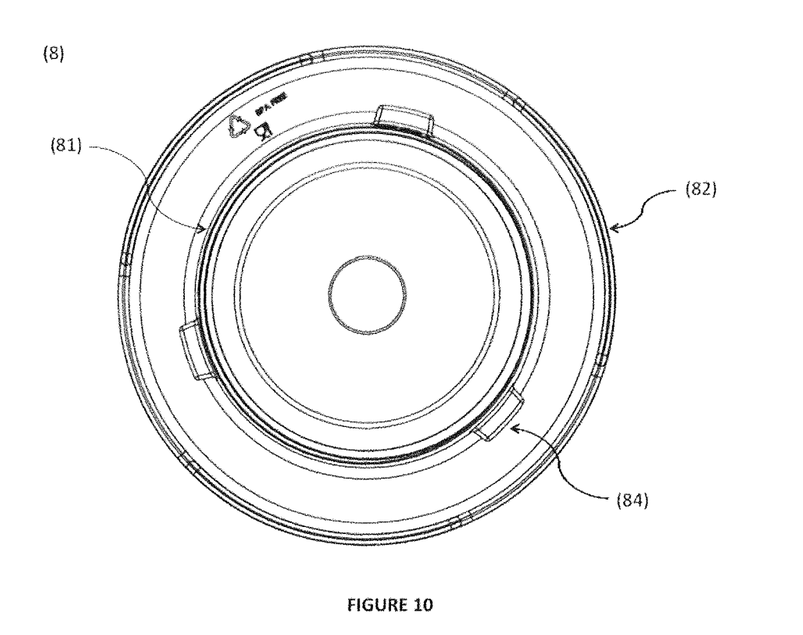
FIG. 10: a top view of the closing element (8) according to FIG. 9.
Figure 11:
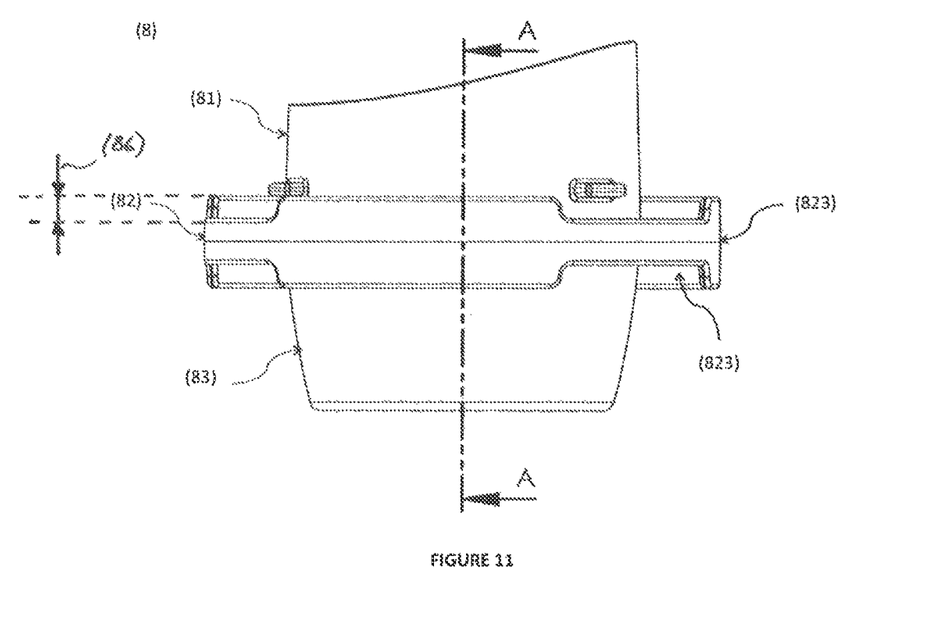
FIG. 11: a side view of the closing element (8) according to FIG. 9.

FIG. 8 illustrates an advantageous embodiment of the food processing system (1) according to the present invention, whereby there is further provided a closing element (8) adapted so that it can be placed upon said wall part (71) thereby substantially closing said lid opening (31).

According to an advantageous embodiment, and as best depicted in FIGS. 9 to 12, said closing element (8) includes a first part (81) presenting a tubular, advantageously frusto-conic form extending upwards from a second part (82), said second part (82) provided as an annular element projecting outwards and arranged between said first part (81) and a third part (83), and said third part (83) presenting a tubular, advantageously frusto-conic form extending downwards from said second part (82).

According to an advantageous embodiment, said second part (82) of said closing element (8) includes a base part (821) and a closing wall part (822) extending upwards and downwards of the perimeter edge of said base part (821), whereby said closing wall part (822) further presents indents (823) defining a height variation in relation to said base part (821) along the radial direction that generally corresponds to the level difference between said second surface (33) and at least a lower level of said first surface (32) along a respective perimeter.

According to an advantageous embodiment, said plurality of indents (823) is provided in both the upwards and downwards extensions of said closing wall part (822) relative to said base part (821), whereby said indents (823) generally correspond to height variations (86) of a respective top edge and are advantageously evenly distributed along the radial direction, thereby providing a flow communication between outside and inside parts of said second surface (33) in respect of the diameter of said closing wall part (822), and from said inside part of said second surface (33) through said lid opening (31) into said recipient (2), when said lid (3) is placed thereupon and regardless of which of said first and third parts (81, 83) of said closing element (8) is placed in said lid opening (31).

According to another advantageous embodiment, at least one of first (81) or third (83) parts of said closing element (8) present a plurality of tongues (84) projecting outwards from its outside side surface and adapted so that they can engage with retaining means (34) provided in corresponding radial positions, advantageously on the downwards oriented side of said lid opening (31), so that said closing element (8) can be optionally retained in a given position with said lid (3). This advantageously provides for the possibility of a user retaining said closing element (8) in said lid opening (31) thereby preventing hazardous spillovers of hot liquids from inside.

Figure 12:
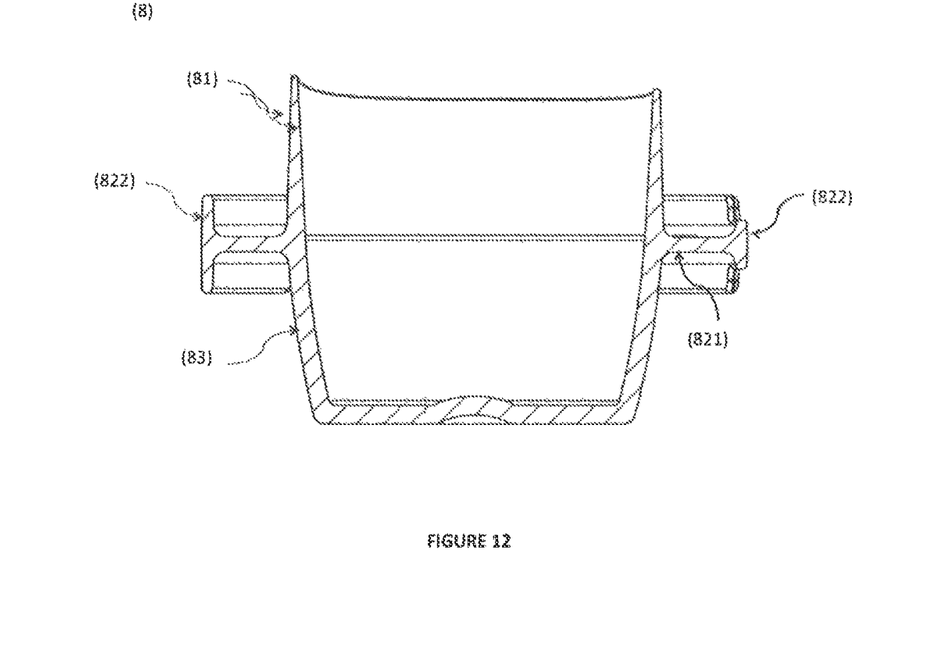
FIG. 12: a side-cut view of the closing element (8) according to the cut plane AA indicated in FIG. 11.
Figure 13:
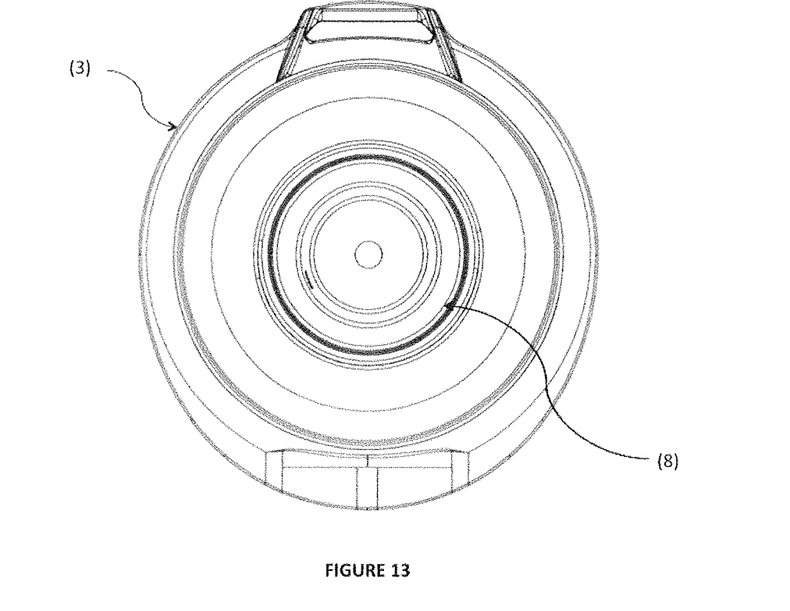
FIG. 13: a top view of the lid (3) with closing element (8)
Figure 14:
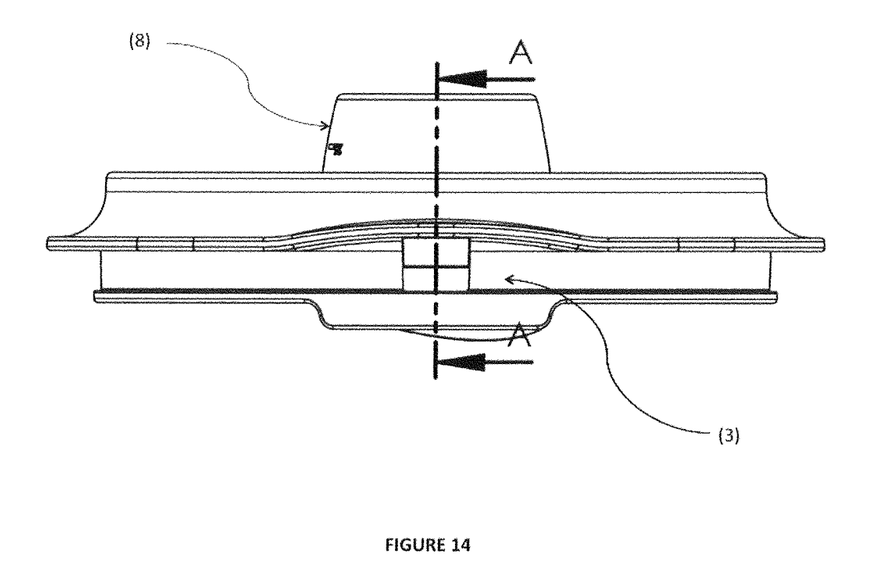
FIG. 14: a side view of the lid (3) with closing element (8) according to FIG. 13.

FIGS. 12 to 14 depict the general views of a lid (3) with a closing element (8) adapted for substantially closing and optional mechanic retention in a respective lid opening (31), in a food processing system (1) according to the present invention.

According to an advantageous embodiment, said first part (81) defines an open cup-like collection volume and said third part (83) defines a closed form of different volume divided from said first part (81) by said second part (82), or both of said first and third parts (83) define a single cup-like collection volume.

Figure 15:
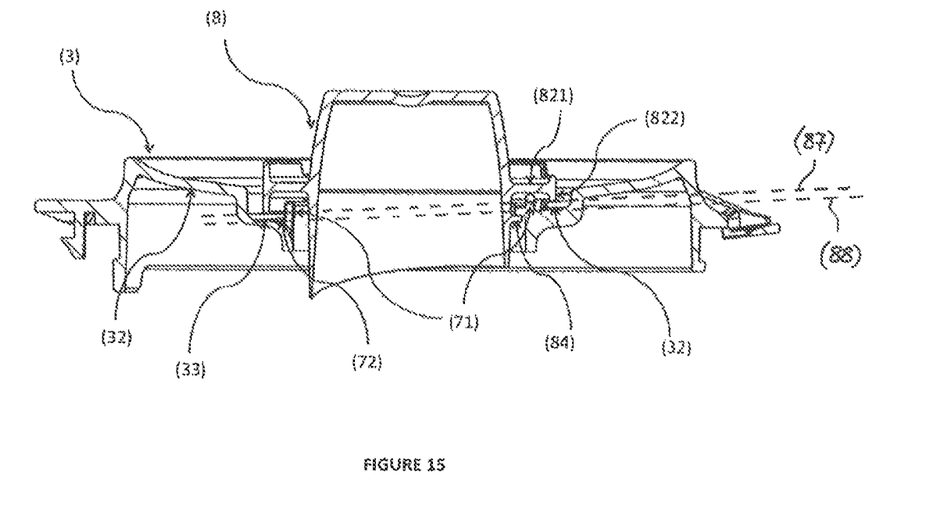
FIG. 15: a side-cut view of the lid (3) with closing element (8) according to the cut plane AA indicated in FIG. 14.

According to another embodiment, and as best depicted in FIG. 15, considering the inclination of said second surface (33) relative to a horizontal plane and towards said at least one flow part (72), provides that said closing element (8) is supported in its closing wall part (822) by said second surface (33) and in its base part (821) by said wall part (71) of said flow guiding means (7) along part of the perimeter of said second surface (33) but not in the region of said flow part (72) where there remains a distance between said closing wall part (822) and said second surface (33), so that fluid poured upon said second surface (33) can further flow through said lid opening (31) into said recipient (2), even when said closing element (8) is placed in said lid opening (31).

This arrangement advantageously provides for the possibility of pouring a seasoning fluid into the outside part of said second surface (33), when said closing element (8) is placed in said lid opening (31), and further obtaining a flow thereof into said recipient (2) through said at least one flow part (72).

Furthermore, said second part (82) of said closing element (8) comprises said base part (821) and said closing wall part (822) extending upwards and downwards of the perimeter edge of said base part (821) and presenting a height (87) in relation to said base part (821) that generally corresponds at least to the level difference (88) between said second surface (33) and a lower level of said first surface (32) along a respective perimeter.

Figure 16:
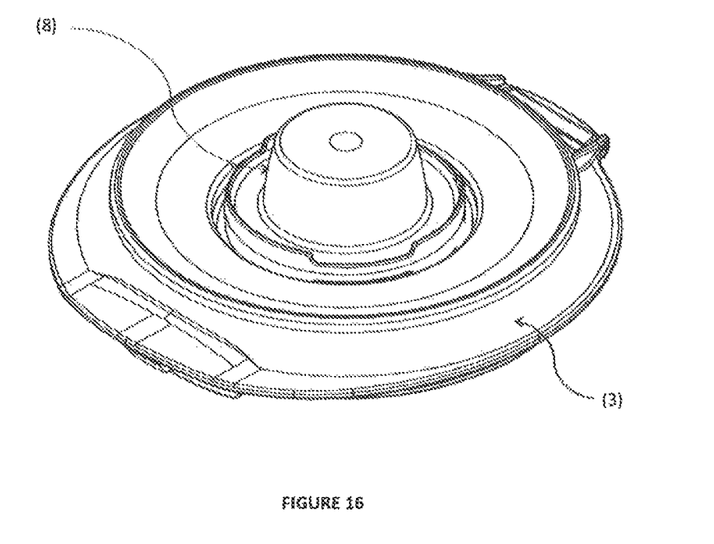
FIG. 16: a perspective view from above of the lid (3) with closing element (8).

FIG. 16 represents a perspective view of the ensemble arrangement of said closing element (8) placed in said lid opening (31) of said lid (3) thereby partially dividing said second surface (33) into an exterior and interior zones that are provided in fluid communication with the interior of said recipient (2) through said flow guiding means (7), in particular through at least one respective flow part (72), when said lid (3) is placed upon said recipient (2).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Food processing system for processing food ingredients comprising a recipient to receive food ingredients and a lid presenting an upwards side and a downwards side to engage with a perimeter edge of said recipient, a food processing tool, a tool support that supports the food processing tool inside of said recipient, and a driving arrangement confined within a casing to drive the tool support,
    wherein said lid presents a lid opening presenting a generally circular form and centered relative to said lid,
    wherein the upwards side of said lid presents a first surface extending on a generally outer region of said lid and further presents a second surface extending around at least part of said lid opening and developing at a lower level in respect of said first surface,
    wherein said lid presents a flow-guiding unit arranged next to said lid opening, comprising a wall part and at least one flow part, and an amount of fluid poured upon said second surface can be comprised inwards along most of a perimeter of said lid opening and can flow under an action of a gravity force through said lid opening into said recipient when said lid is arranged on said recipient,
    wherein said system further comprises a cup-shaped closing element comprising, a first part presenting a tubular, frusta-conic form, extending upwards from a second part, said second part provided as an annular element projecting outwards and arranged between said first par and a third part, and said third part presenting a tubular, frusto-conic form, extending downwards from said second part, wherein said closing element can be placed on said lid opening to at least partially close said lid opening,
    wherein said second part of said closing element comprises a base part and a closing wall part extending upwards and downwards of a perimeter edge of said base part and presenting a height in relation to said base part that generally corresponds at least to a level difference between said second surface and a lower level of said first surface along a respective perimeter, so that said closing element is supported at a closing wall part by said second surface and at a base part by said wall part of a flow guiding unit along part of the perimeter of said second surface but not in a region of said flow part where there remains a distance between said closing wall part and said second surface, so that fluid poured upon said second surface can further flow through said lid opening into said recipient, even when said closing element is placed in said lid opening.

2. Food processing system according to claim 1, wherein said flow-guiding unit comprises a wall part extending upwards from an edge of said lid opening and extending along part of the perimeter of said lid opening, and at least one flow part that is provided as a flow passage section in said wall part and said fluid can flow streamlined through said lid opening.

3. Food processing system according to claim 1, wherein said wall part presents a height along a respective perimeter extension in relation to said second surface, wherein said height follows a level difference between said second surface and said first surface along the respective perimeter extension.

4. Food processing system according to claim 1, wherein said flow part is a spout shaped arrangement comprising a constrain of flow passage section and a downwards oriented flow surface in relation to said second surface, and in that said flow part presents a narrowing of flow passage section directed towards said lid opening.

5. Food processing system according to claim 1, wherein said flow part presents a curved or straight flow surface between said second surface and said lid opening to generate a streamlined flow of said liquid into said recipient.

6. Food processing system according to claim 1, wherein said second surface presents at least one inclination relative to a horizontal plane and towards a flow part, wherein said flow part is arranged at a lowest part of said second surface.

7. Food processing system according to claim 1, wherein said first part defines an open cup-like collection volume and said third part defines a closed form of different volume divided from said first part by said second part, or both of said first and third parts define a single cup-like collection volume, and
    in that at least one of first or third parts of said closing element present a plurality of tongues projecting outwards from its outside side surface and that can engage with a retaining unit provided in corresponding radial positions, on a downwards oriented side of said lid opening, so that said closing element can be optionally retained in a given position with said lid.

8. Food processing system according to claim 1, wherein said second surface presents at least one cavity element, such as a cavity of channel-like, or a plurality of cavity elements in fluid communication with each other and with a respective flow part, and
    in that said second surface presents at least one marking, disposed along said wall part and towards said flow part, wherein said marking indicates at least one of a general flow direction and fluid quantities.

9. Process for using a food processing system presenting a recipient to receive food ingredients and a lid presenting an upwards side and a downwards side to engage with the perimeter of said recipient thereby at least partially closing said recipient, and a driving arrangement confined within a casing to drive a tool support arranged inside of said recipient, wherein said lid presents a single lid opening presenting a generally circular form and centered relative to said lid, wherein the upwards side of said lid presents a first surface extending on a generally outer region of said lid and further presents a second surface extending around at least part of said opening and developing at a lower level in respect of said first surface, in particular a food processing system according to claim 1,
    wherein said process comprises:
    providing food ingredients to said recipient and placing said lid upon said recipient, in a removable fixed engagement with the perimeter edge of said recipient,
    optionally actuating said driving arrangement,
    pouring a fluid upon said second surface, wherein said fluid is conducted under the action of the force gravity into said recipient via a flow guiding unit provided next to said lid opening of said lid.

10. Process according to claim 9, wherein said fluid is poured upon at least one previously defined region of said second surface of said lid.

11. Process according to claim 9, wherein said flow is conducted along said second surface, comprised by a wall part along at least part of the perimeter of said lid opening, and through at least one flow part provided next to said lid opening, into said recipient.

12. Process according to claim 9, further comprising:
placing a closing element on the lid opening, and
eventually rotating said closing element so as to retain said closing element in said lid opening, thereby optionally further allowing said fluid to flow there through into said recipient.

13. Food processing system for processing food ingredients comprising a recipient to receive food ingredients and a lid presenting an upwards side and a downwards side to engage with a perimeter edge of said recipient, a food processing tool, a tool support that supports the food processing tool inside of said recipient, and a driving arrangement confined within a casing to drive the tool support,
wherein said lid presents a lid opening presenting a generally circular form and centered relative to said lid,
wherein the upwards side of said lid presents a first surface extending on a generally outer region of said lid and further presents a second surface extending around at least part of said lid opening and developing at a lower level in respect of said first surface,
wherein said lid presents a flow-guiding unit arranged next to said lid opening, comprising a wall part and at least one flow part, and an amount of fluid poured upon said second surface can be comprised inwards along most of a perimeter of said lid opening and can flow under an action of a gravity force through said lid opening into said recipient when said lid is arranged on said recipient,
wherein said system further comprises a cup-shaped closing element comprising a first part presenting a tubular, frusto-conic form, extending upwards from a second part, said second part provided as an annular element projecting outwards and arranged between said first part and a third part, and said third part presenting a tubular, frusto-conic form, extending downwards from said second part, wherein said closing element can be placed on said lid opening thereby at least partially closing said lid opening,
wherein said second part of said closing element comprises a base part and wherein said closing element comprises a closing wall part that presents a plurality of indents in both upwards and downwards extensions thereof relative to said base part, wherein said indents generally correspond to height variations of a respective top edge and are evenly distributed along a radial direction, thereby providing a flow communication between outside and inside parts of said second surface in respect of a diameter of said closing wall part, and from said inside part of said second surface through said lid opening into said recipient, when said lid is placed thereupon and regardless of which of said first and third parts of said closing element is placed in said lid opening.

14. Food processing system for processing food ingredients comprising a recipient to receive food ingredients and a lid presenting an upwards side and a downwards side to engage with a perimeter edge of said recipient, a food processing tool, a tool support that supports the food processing tool inside of said recipient, and a driving arrangement confined within a casing to drive the tool support,
wherein said lid presents a lid opening presenting a generally circular form and centered relative to said lid,
wherein the upwards side of said lid presents a first surface extending on a generally outer region of said lid and further presents a second surface extending around at least part of said lid opening and developing at a lower level in respect of said first surface,
wherein said lid presents a flow-guiding unit arranged next to said lid opening, comprising a wall part and at least one flow part, and an amount of fluid poured upon said second surface can be comprised inwards along most of a perimeter of said lid opening and can flow under an action of a gravity force through said lid opening into said recipient when said lid is arranged on said recipient,
wherein said second surface presents at least one cavity element defined by a cavity of channel or a plurality of cavity elements in fluid communication with each other and with a respective flow part, and
said second surface presents at least one marking, disposed along said wall part and towards said flow part, wherein said marking indicates at least one of a general flow direction and fluid quantities.

* * * * *